March 20, 1962 R. P. LEWIS 3,025,686
CLUTCH DISCS
Filed May 24, 1961 2 Sheets-Sheet 1

INVENTOR.
ROBERT P. LEWIS
BY
Malcolm W. Prosser
ATTORNEY

March 20, 1962 R. P. LEWIS 3,025,686
CLUTCH DISCS

Filed May 24, 1961 2 Sheets-Sheet 2

INVENTOR.
ROBERT P. LEWIS
BY
*Malcolm W. Fraser*
ATTORNEY

United States Patent Office 3,025,686
Patented Mar. 20, 1962

3,025,686
CLUTCH DISCS
Robert P. Lewis, 2256 Densmore Drive, Toledo, Ohio
Filed May 24, 1961, Ser. No. 112,278
6 Claims. (Cl. 64—30)

This invention relates to clutch discs such, for example, as used in wet multiple disc clutches, where the discs are constantly loaded but may be used to advantage in other types of clutches.

An object is to produce a clutch disc which does not chatter, is not noisy, and is essentially free of vibration.

Another object is to produce a clutch disc assembly in which provision is made to prevent damage and to reduce wear to the contact surfaces when the discs are moving relatively to each other.

A further object is to provide new and improved means for lubricating adjacent clutch discs and for quickly disposing of excess surface lubricant to afford additional friction as required.

A still further object is to produce a clutch disc assembly in which lubricant is circulated between and over the entire contact surfaces of all of the discs even when they are in contact with each other and are under pressure.

A still further object is to dampen the vibration originating from "stick-slip" friction in a disc clutch or torsional effects and prevent highly localized loads and the effects from thermal stresses due to distortion or expansion from heat.

Other objects and advantages of the invention will hereinafter appear, and, for purposes of illustration but not of limitation, embodiments of the invention are shown in the accompanying drawings, in which FIGURE 1 is a longitudinal sectional view of a clutch disc assembly, showing an application of the clutch discs constituting this invention;

Figure 1:
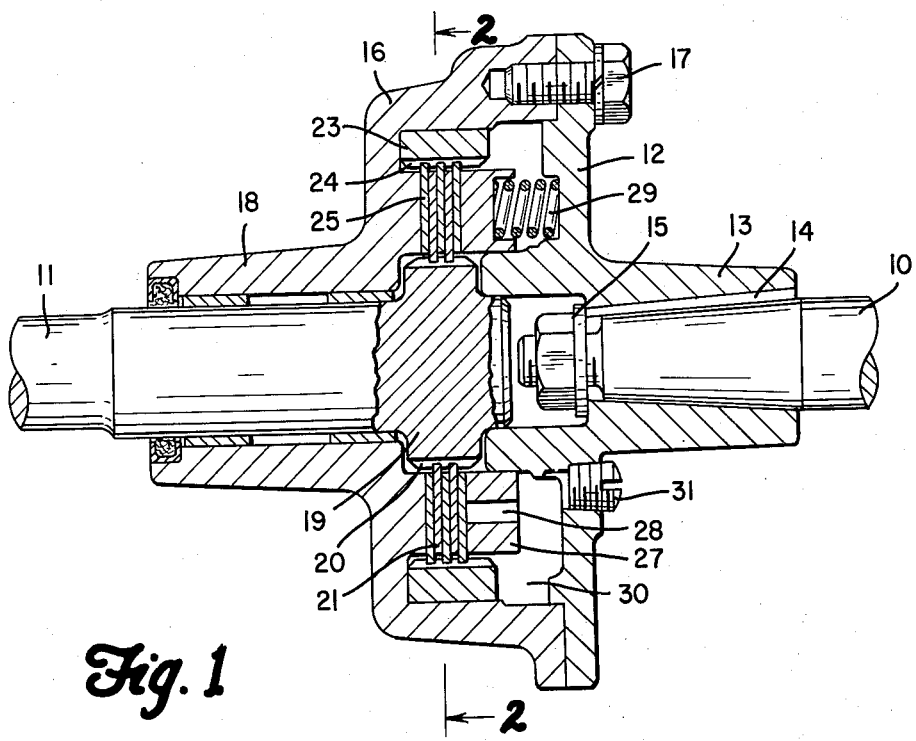

The illustrated embodiment of the invention comprises a pair of shafts 10 and 11, between which is disposed a clutch assembly. In the form shown, the clutch is of a pre-loaded type, such as used for over-load and safety clutches, and limited slip differentials. The clutch assembly comprises a housing having a plate 12 provided with an axial laterally extending sleeve 13 secured by a key 14 to the end portion of the shaft 10. The shaft 10 has a screw threaded reduced end portion receiving a washer and nut assembly 15 for engaging a shoulder on the plate 12 for retaining the parts in assembled position. Cooperating with the plate 12 is a drum-like housing part 16, which is secured in liquid tight relation to the plate 12 by a series of screws 17. The housing part 16 has a laterally extending sleeve 18, in which the shaft end portion 11 is rotatable, and has suitable bearing. The shaft 11 has a cylindrical enlargement 19 disposed within the housing part 16, and on the outside of the enlargement 19 are splines 20. Clutch discs 21 have at their inner edges splines 22, which engage the splines 20 on the shaft enlargement 19. Pressed into the housing part 16 is a ring 23, which has a series of splines 24 on its inner edge, receiving splines 26 on the clutch discs 25 which alternate with the clutch discs 21. In this instance, the clutch discs 21 and 25 are pre-loaded, and as shown, there is a spring pressed ring 27, which is constantly urged against the discs by a series of coil springs 29, one end of each coil spring bearing against the plate 12 and against a socketed part of the ring 27 at the opposite end. Suitable lubricant holes 28 in the ring 27 enable lubricant from the oil chamber 30 to pass to the clutch discs.

The inner attached clutch discs 21 are formed with a row of slots 32, each arranged angularly to the radii of the respective disc. The inner end of each slot is provided with an enlargement 33, which is disposed close to the inner edge portion of the disc. In the form shown, the angular slots 32 are unformly spaced apart, but if desired the spacing may be irregular. The slots 32 as shown are inclined in a counter-clockwise direction, and provide a series of segments 34, which can flex relatively to each other. This enables each segment readily to deflect and properly mate with its corresponding partner, without localized contact and heavy stresses. Thus, the several segments are not affected by distortion due to frictional heat or thermal stresses. Each segment can also deflect radially to help break up any "stick slip" or torsional vibration, making use of the clutch friction to help dampen this vibration.

The outer attached discs 25 are somewhat similarly constructed and, as shown, each disc is provided with a series of angularly disposed slots which terminate at the inner edge and at the outer end are provided with enlargements 36, which are positioned close to the peripheral edge portion thereof. These slots, as shown on FIGURE 3, also incline from the enlargements 36 in a counter clockwise direction, but manifestly are differently arranged from the slots 32 in the inner attached discs 34. As shown, the slots 35 provide an annular row of segments 37, which are of uniform size, but may be made non-uniform to counteract any exceptional vibration condition.

Figure 2:
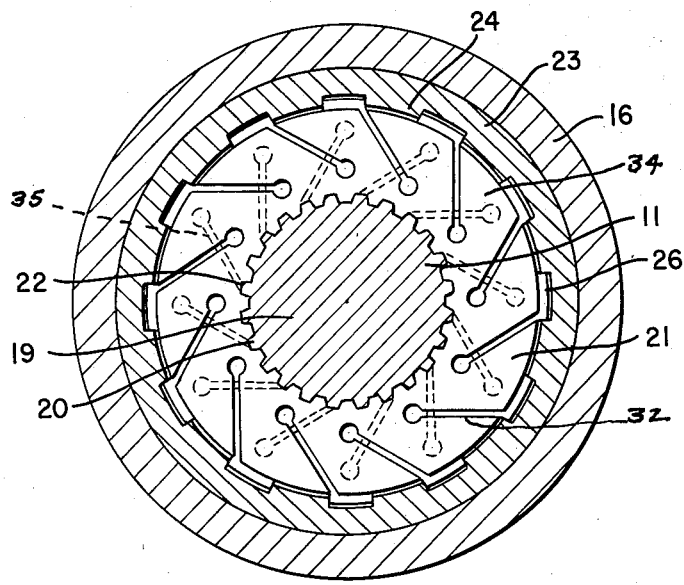
FIGURE 2 is a transverse sectional view substantially on the line 2—2 of FIGURE 1.

In view of the arrangement of the slots 32 and 35 in the discs 21 and 25 respectively, adjacent slots intersect each other as indicated in FIGURE 2. Thus, at the point of intersection of the slots, an opening is provided laterally to the adjacent discs, and its radial location is constantly changing permitting lubricant freely to circulate, thereby providing lubrication and cooling to all the contact surfaces as they move relatively to each other. The discs, in turn, wipe off the excess lubricant to provide direct contact and the increased friction desired. Preferably the edges of the slots 25 and 32 are rounded or beveled to militate against any interference in the operation of the disc segments.

It will be understood that the slots in certain of the discs are angularly disposed with respect to the corresponding slots in the adjacent discs. If desired, the slots in one or another disc may be radial so long as the slots in the adjacent discs are in crossing relation thereby to provide the desired openings at the points of intersection to enable the flow of lubricant to all of the discs.

Figure 3:
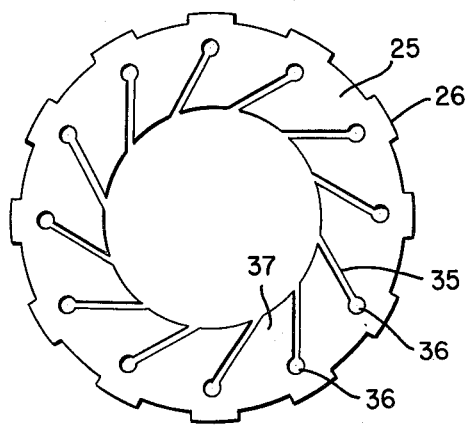
FIGURE 3 is a plan view of one of the outer attached clutch discs.
Figure 4:
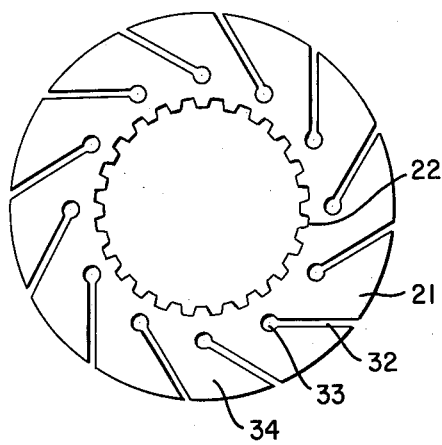
FIGURE 4 is a plan view of one of the inner attached clutch discs.
Figure 5:
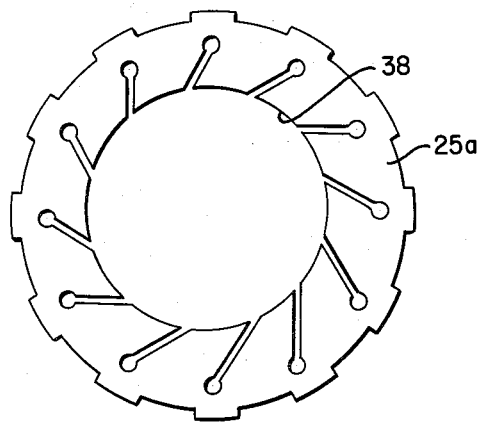
FIGURE 5 is a plan view of an outer attached clutch disc, constituting an alternate form in which the hole at the center is eccentric.
Figure 6:
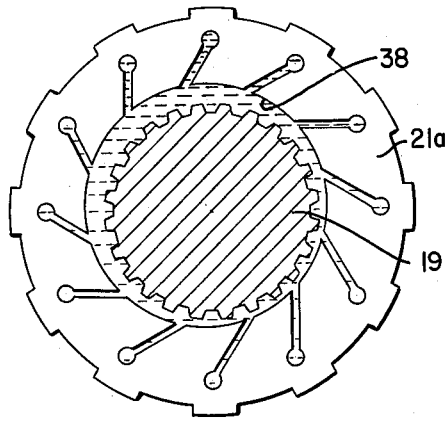
FIGURE 6 is a somewhat diagrammatic view showing an outer attached clutch disc associated with the splined shaft end portion, and the eccentric relation between the parts.

In the alternate form shown on FIGURES 5 and 6, an outer attached disc 25a is provided with the flexible segments as indicated on FIGURE 3. However, in this form, the inner hole 38 is not concentric as in the form previously described, but, instead, it is eccentrically arranged. As shown in FIGURE 6, this provides for a method of circulating the oil for lubricating and cooling the disc contact surfaces of multiple disc clutches. The additional space provided by the eccentric arrangement of the hole affords the space for the storage of an extra amount of lubricant, where it is at all times available, and particularly when the disc surfaces are not in relative motion to each other. As soon as relative motion takes place between the discs, the eccentric center of the outer attached discs wipes the lubricant from this part of the surfaces of the inner discs, forcing the lubricant, aided by centrifugal force, to circulate between the surfaces of all of the discs.

The beneficial result secured by providing an eccentric opening at the center of the outer attached discs is achieved whether the discs are segmented, plain, grooved, or any combination of these forms.

Numerous changes may be made in details of construction, arrangement, and choice of materials without departing from the spirit of the invention, especially as defined in the appended claims.

What I claim is:

1. In a clutch, the combination of driving and driven clutch discs, each disc having a center hole and a series of slots arranged at an angle to the radii thereof and alternating discs having the slots differently arranged so as to intersect at an angle the slots respectively of the adjacent discs thereby to provide holes at the points of intersection for the lateral passage of lubricant from one disc to another and the angularity of the slots enables the constant changing of the radial location of such holes so that the entire surface of each disc is readily supplied with lubricant during its relative rotation with adjacent discs.

2. In a clutch, as claimed in claim 1, in which the slots are so arranged as to provide a plurality of angular flexible segments to easily deflect and mate with their corresponding partners to assure uniform contact of all disc surfaces, thus automatically correcting any distortion of individual segments due to generated heat in operation or the release of residual stresses thus avoiding highly localized loads and stresses.

3. In a clutch, the combination of driving and driven clutch discs, each disc having a series of slots and the slots of certain discs being angularly disposed so as to cross the slots in adjacent discs, thereby to provide openings for the lateral passage of lubricant therethrough from one disc to another and the angularity of the slots enables the constant changing of the radial location of such holes so that the entire surface of each disc is readily supplied with lubricant during its relative rotation with adjacent discs.

4. In a clutch, the combination of driving and driven clutch discs, each disc having a center hole and a series of slots arranged at an angle to the radii thereof and alternating discs having the slots differently arranged so as to intersect at an angle the slots respectively of the adjacent discs whereby to provide holes at the points of intersection for the lateral passage of lubricant from one disc to another, the center hole on each outer attached disc being eccentric to wipe lubricant from the adjacent surfaces of the inner attached discs and force lubricant aided by centrifugal force to circulate between the surfaces of the discs.

5. In a clutch, alternating inner and outer attached juxtaposed clutch discs having center holes, driving and driven members for said inner and outer discs respectively, the center holes of the inner attached discs being concentric with the respective member, and the holes for the outer attached discs being eccentric to the axis of the holes of the inner attached discs thereby providing a storage space for lubricant so that under relative rotation the edge of the eccentric hole moves radially over the surface of the inner discs creating a wedge type pumping action aided by centrifugal force, forcing the lubricant between the discs.

6. In a clutch for connecting driving and driven shafts, the combination of a closed housing forming a chamber enclosing the end portions of the shafts, alternating inner and outer attached juxtaposed clutch discs having center holes, the outer attached clutch discs having slots from the inner edge thereof extending angularly from the radii to form a series of flexible segments, the inner attached clutch discs having slots extending from the outer edge thereof angularly from the radii and in position to intersect the slots of the other discs, thereby to provide holes for the circulation of lubricant from said chamber, and the hole at the center of each outer attached clutch disc being eccentric.

References Cited in the file of this patent

UNITED STATES PATENTS

| | | |
|---|---|---|
| 2,150,950 | Thoma | Mar. 21, 1939 |
| 2,743,792 | Ransom | May 1, 1956 |
| 2,989,161 | Diebold | June 20, 1961 |

FOREIGN PATENTS

| | | |
|---|---|---|
| 341,243 | Great Britain | Jan. 15, 1931 |